United States Patent [19]

Roth, Jr. et al.

[11] 3,941,747

[45] Mar. 2, 1976

[54] OLEFIN POLYMER COMPOSITIONS STABILIZED AGAINST DISCOLORATION

[75] Inventors: Clarence Edward Roth, Jr.; Joseph Arnold Lasswell; William Dennis Bybee; Earl Brewer Parker, Jr., all of Orange, Tex.

[73] Assignee: Gulf Oil Corporation, Pittsburgh, Pa.

[22] Filed: Nov. 27, 1973

[21] Appl. No.: 419,240

[52] U.S. Cl. .......................................... 260/45.95 H
[51] Int. Cl.² .......................................... C08G 6/00
[58] Field of Search ................... 260/45.95, 45.95 H

[56] References Cited

UNITED STATES PATENTS

| | | | |
|---|---|---|---|
| 2,785,188 | 3/1957 | Coe | 260/45.95 |
| 2,956,306 | 10/1960 | Conwell et al. | 260/45.95 H |
| 2,957,849 | 10/1960 | Kennedy | 260/45.95 H |
| 3,069,369 | 12/1962 | Galbraith et al. | 260/45.95 H |
| 3,103,501 | 9/1963 | Shearer et al. | 260/45.7 P |
| 3,349,072 | 10/1967 | Alexander et al. | 260/94.9 R |
| 3,351,678 | 11/1967 | McBurney | 260/45.95 H |
| 3,553,272 | 1/1971 | Riley | 260/45.95 H |

OTHER PUBLICATIONS

Atmospheric Oxidation and Antioxidants, by Gerald Scott; Elsenier Press; 1965; pp. 124 to 141.

*Primary Examiner*—V. P. Hoke

[57] ABSTRACT

Olefin polymer compositions are provided having enhanced stability against discoloration. The polymer compositions consist essentially of a normally solid olefin polymer such as polyethylene having incorporated therein, on a weight basis, 0.001 – 0.2 percent of 2,6-ditertiarybutyl-4-methylphenol* and 0.0005 – 0.4 percent of 2,6-ditertiarybutyl-4-ethylphenol**, with the quantity of 2,6-ditertiarybutyl-4-ethylphenol being present in a minimum amount of 50 weight % of the 2,6-ditertiarybutyl-4-methylphenol.

*In subsequent discussions, this chemical sometimes will be referred to as BHT, which signifies butylated hydroxy toluene

**In subsequent discussions, 2,6-ditertiarybutyl-4-ethylphenol sometimes will be referred to as BHEB, which signifies butylated hydroxy ethylbenzene.

4 Claims, No Drawings

OLEFIN POLYMER COMPOSITIONS STABILIZED AGAINST DISCOLORATION

BACKGROUND OF THE INVENTION

Normally, solid olefin polymers, such as polyethylene and polypropylene, are known to be subject to oxidation. Oxidation of the polymers causes crosslinking and other undesired changes in the polymer. To alleviate this problem, certain antioxidants or stabilizers are conventionally included in such olefin polymers.

One of the most widely used stabilizers for olefin polymers, and particularly polyethylene, is 2,6-ditertiarybutyl-4-methylphenol. While this stabilizer is quite effective in protecting olefin polymers, and in particular polyethylene, it has a shortcoming in that under certain conditions of storage it causes yellowing or discoloration of the polymer. The yellowing of the polymer is particularly objectionable in film applications, where for the end use it is usually desirable to have the film as transparent and as color free as is possible.

SUMMARY OF THE INVENTION

It has been discovered pursuant to this invention that it is possible to prepare olefin polymer compositions containing 2,6-ditertiarybutyl-4-methylphenol as a stabilizer while at the same time alleviating or minimizing the yellowing which is characteristically associated with such resin compositions. These results are obtained by incorporating into the olefin polymer, on a weight basis, a mixture of 0.001 – 0.2 percent of 2,6-ditertiarybutyl-4-methylphenol (BHT) and 0.0005 – 0.4 percent of 2,6-ditertiarybutyl-4-ethylphenol (BHEB) with the BHEB being present in a minimum amount of 50 weight % of the BHT or preferably at least 100 weight % of the BHT.

DETAILED DESCRIPTION OF THE INVENTION

The olefin polymer included in the composition of the invention will be normally solid olefin polymers having polymerized therein at least 90 weight percent of either ethylene or propylene or a mixture thereof. Typically, the olefin polymer will be an ethylene homopolymer, which may be either of the so-called low density type prepared by mass free radical processes or a high density polyethylene prepared in the presence of a stereospecific catalyst. The olefin polymer also may be a crystalline propylene polymer of the type prepared by polymerizing propylene in the presence of stereospecific catalysts. Methods of preparing such olefin polymers are well known and are reported in the literature.

The 2,6-ditertiarybutyl-4-methylphenol (BHT) and 2,6-ditertiarybutyl-4-ethylphenol (BHEB) employed as stabilizers in the compositions of the invention are known compounds which are commercially available. The BHT is customarily included in the compositions of the invention in the amount of, on a weight basis, 0.001 – 0.2 percent. The BHEB is customarily included in the compositions of the invention in the amount of, on a weight basis, 0.0005 – 0.4 percent. The BHEB will be employed in an amount equal to at least 50% of, and preferably at least 100% of, the weight of the BHT.

The compositions of the invention can be prepared by simply dispersing the mixture of the two stabilizers into the olefin polymer by conventional methods such as compounding in a banbury mixer or in a compounding extruder. In an alternate embodiment of the invention, the BHT can be incorporated into the ethylene polymer by adding small quantities of the BHT to the polymerization reactor in which the ethylene polymer is prepared as disclosed in U.S. Pat. No. 3,349,072. Thereafter, the BHEB can be incorporated into the thus prepared resin in a compounding step.

In addition to the mixture of stabilizers previously described, the polymer compositions of the invention also may have incorporated therein conventional additives such as slip agents, antiblock agents, colorants, and the like. Such additives can be incorporated into the resin compositions by methods well known in the art.

The polyolefin resin compositions of the invention have physical properties and processing characteristics identical in all material respects to polyolefin resin compositions containing like quantities of BHT as the sole phenolic stabilizing agent. By reason of their greater resistance to yellowing, however, the polyolefin resin compositions of the invention can be processed at somewhat higher temperatures in applications where discoloration of the fabricated resin article is a matter of critical concern.

An Accelerated Aging Test was developed for use in the studies reported herein. The Accelerated Test is based upon two demonstrated principles. First, it has been demonstrated that the yellow color bodies which develop on aging of a polyolefin resin containing BHT is 3,5,3′,5′-tetra-t-butyl stilbene-4,4′quinone (SBQ). Second, it has been demonstrated that SBQ can be extracted essentially quantitatively from a polyolefin resin containing same in a short period of time.

A 10 gram sample of the resin is ground to a size passing through a 10 mesh screen. Ten (10) grams of resin and 1 gram of carbon black are transferred into a glass stoppered 250 ml Erlenmeyer flask. The flask is stoppered and shaken to homogeneously distribute the carbon black over all the resin particles. The unstoppered flask then is maintained in a forced draft oven at 50°C. for 12 hours. The flask then is removed from the oven and cooled to room temperature. One hundred (100) ml of specially purified hexane having no measurable absorption in the visible spectrum are then added to the flask. The flask then is stoppered and placed in the 50°C. oven for 15 minutes. The flask then is removed from the oven and allowed to cool to room temperature. The contents of the flask are filtered and the hexane is retained for measurement of color absorption in the visible spectrum.

The hexane solution obtained as above described is placed in 1 of a pair of matched 10 millimeter or 50 millimeter cells for measuring absorption in a spectrophotometer. The second cell is filled with the hexane solvent. The absorption at 447 millimicrons of the sample and the pure solvent is measured. The difference in the absorption peaks is taken as a measure of the concentration of the yellow color bodies. The measured value is compared with a standard curve prepared using 3,5,3′,5′-tetra-t-butyl silbene-4,4′quinone (SBQ) as the colorant. The results are expressed in terms of parts per million of SBQ.

The following examples are set forth and illustrate the principle and practice of the invention to those skilled in the art.

EXAMPLE 1

A series of low density polyethylene resins containing varying quantities of BHT were prepared to show the level of SBQ which develops in the Accelerated Aging Test. The four resins prepared contained, respectively, 20, 80, 170 and 400 ppm of BHT. The SBQ values are shown in Table I.

Table I

| BHT Content, ppm | SBQ Developed, ppm |
|---|---|
| 20 | 2.7 |
| 80 | 9.3 |
| 170 | 15 |
| 400 | 20 |

EXAMPLE 2

A low density polyethylene resin containing 110 ppm of BHT was prepared. The sample was divided into two parts. One part was maintained as a control and 390 ppm of BHEB was dispersed into the second portion in a banbury mixer.

Both samples were subjected to the Accelerated Aging Test. The control sample developed approximately 10 ppm SBQ, whereas the sample containing the BHEB developed less than 1 ppm SBQ.

EXAMPLE 3

A series of low density polyethylene resins were prepared to contain approximately 500 ppm of a mixture of BHT and BHEB, with the ratio of BHT and BHEB being varied. The SBQ values of the resins were measured by the Accelerated Aging Test and the results are shown below.

Table II

| Sample No. | A | B | C | D | E | F | G | H |
|---|---|---|---|---|---|---|---|---|
| ppm BHT | 450 | 142 | 181 | 222 | 261 | 305 | 388 | 451 |
| ppm BHEB | 0 | 341 | 306 | 271 | 246 | 200 | 130 | 54 |
| SBQ Value | 25 | 0.8 | 1.6 | 2.8 | 3.9 | 7.3 | 10.3 | 18. |

We claim:

1. An olefin polymer composition consisting essentially of a normally solid olefin polymer having incorporated therein, on a weight basis, 0.001 – 0.2 percent of 2,6-di-tertiarybutyl-4-methylphenol and 0.0005 – 0.4 percent of 2,6-ditertiarybutyl-4-ethylphenol, the 2,6-ditertiarybutyl-4-ethylphenol being present in an amount constituting at least 50% by weight of the 2,6-ditertiarybutyl-4-methylphenol, said olefin polymer having polymerized therein at least 90 weight percent of a monoolefin of the group consisting of ethylene and propylene.

2. A composition of claim 1 wherein the olefin polymer is an ethylene homopolymer.

3. A composition of claim 1 wherein the olefin polymer is a crystalline propylene polymer.

4. A method for retarding the yellowing of a normally solid olefin polymer containing 2,6-ditertiarybutyl-4-methyl-phenol as a stabilizer, which consists essentially of dispersing 0.0005 – 0.4 weight percent of 2,6-ditertiarybutyl-4-ethylphenol throughout said olefin polymer, said 2,6-ditertiarybutyl-4-ethylphenol being added in an amount constituting at least 50% by weight of the 2,6-ditertiarybutyl-4-methylphenol contained in said olefin polymer, said olefin polymer having polymerized therein at least 90 weight percent of a monoolefin of the group consisting of ethylene and propylene.

* * * * *